(12) United States Patent
Jewett et al.

(10) Patent No.: US 6,795,267 B2
(45) Date of Patent: Sep. 21, 2004

(54) GUIDED SERVO WRITING FOR DATA STORAGE MEDIA

(75) Inventors: Richard E. Jewett, Minneapolis, MN (US); Mark R. Drutowski, St. Paul, MN (US); Stephen J. Rothermel, Roseville, MN (US)

(73) Assignee: Imation Corp., Oakdale, MN (US)

(*) Notice: Subject to any disclaimer, the term of this patent is extended or adjusted under 35 U.S.C. 154(b) by 367 days.

(21) Appl. No.: 10/014,222

(22) Filed: Dec. 11, 2001

(65) Prior Publication Data

US 2003/0107837 A1 Jun. 12, 2003

(51) Int. Cl.[7] ............................................. G11B 5/584
(52) U.S. Cl. ..................................................... 360/77.12
(58) Field of Search ......................... 360/77.12, 77.06, 360/77.14, 77.15

(56) References Cited

U.S. PATENT DOCUMENTS

| | | | | |
|---|---|---|---|---|
| 5,121,371 A | * | 6/1992 | Farnsworth et al. | 369/44.26 |
| 5,294,803 A | * | 3/1994 | Pahr | 250/559.36 |
| 6,139,936 A | | 10/2000 | Weiss | |
| 6,194,892 B1 | * | 2/2001 | Lin et al. | 324/207.16 |
| 6,469,859 B1 | * | 10/2002 | Chainer et al. | 360/75 |
| 6,549,364 B1 | * | 4/2003 | Shih | 360/78.06 |

* cited by examiner

Primary Examiner—David Hudspeth
Assistant Examiner—Mitchell Slavitt
(74) Attorney, Agent, or Firm—Eric D. Levinson

(57) ABSTRACT

The invention presents techniques for marking data storage media and responding to disturbances in the marking process. In one embodiment, the invention presents a system that uses a laser to emit a beam to ablate physical marks in a data storage medium. The system includes a sensor such as an optical sensor, configured to detect the position of the data storage medium and to generate a position signal as a function of the position of the data storage medium. An optical device, controlled by an actuator, directs the beam from the laser to an ablation site on the data storage medium as a function of the position signal.

26 Claims, 3 Drawing Sheets

GUIDED SERVO WRITING FOR DATA STORAGE MEDIA

TECHNICAL FIELD

The invention relates to data storage media and, more particularly, to techniques for marking data storage media.

BACKGROUND

Magnetic media are a popular form of data storage media, and are used for storage and retrieval of data. Magnetic media come in many forms, such as magnetic tape and magnetic disks. A write/read head assembly, which includes one or more write/read transducer heads, writes data to and reads data from the magnetic medium. The data stored on the medium are usually organized into "data tracks," and the transducer heads write data to and read data from the data tracks.

Data tracks on magnetic tape are generally parallel to each other, and often are oriented substantially longitudinally on the tape. The head assembly is usually oriented transverse to the path of the magnetic tape so that the transducer heads move transversely across the width of the tape to access the tracks. On a magnetic disk, the data tracks are generally arranged as concentric circles or a spiral pattern on the disk, and the head assembly typically moves along a radius of the disk to access the tracks.

For efficient reading and writing, a transducer head must be accurately positioned to read from or write to a particular data track. A servo control loop typically is provided to control the positioning of the head relative to the data tracks. The medium often includes specialized tracks, called "servo tracks," to serve as references or landmarks for the servo. Data tracks can be located on the magnetic medium according to the displacement of the data tracks from one or more servo tracks.

Servo tracks may include magnetic markers, in which case the surface of the medium is homogeneous but the servo track can be detected magnetically. Another type of servo track is a physical mark on the medium, such as a groove. With this type of servo track, the medium surface is not homogeneous but is physically altered at the site of the servo track. Servo tracks of the latter type can be detected optically. The groove may be discontinuous, allowing an optical sensor to detect a groove signal when a groove is sensed and a reference signal when the groove is absent.

Because servo tracks serve as markers, it is important that the servo tracks be placed on the medium with precision and accuracy. For example, servo tracks on magnetic tape are typically straight and servo tracks on a magnetic disk are nearly perfect circles. A deviation from the ideal shape of a servo track may compromise the effectiveness of the servo track as a marker.

SUMMARY

The invention is directed to techniques for creating tracks, such as physical or magnetic marks, on a data storage medium such as magnetic tape. The physical marks can be used, for example, as servo tracks, and can be detected optically.

The invention will be described in reference to magnetic tape, but the invention is not limited to that particular data storage medium. The invention may be applied for use with other magnetic and optical data storage media.

In one embodiment, the invention presents a system that includes one or more sensors, such as edge detectors, that detect the position of a data storage medium. The system also includes a marking device that marks a track on the data storage medium, such as a laser that ablates a physical track. The system further includes an actuator that causes the marking device to mark the track as a function of the position detected by the sensor. The data storage medium may be a magnetic storage medium, but the invention encompasses other data storage media as well.

In another embodiment, the system presents a method, which includes moving a data storage medium past a marking device, sensing the position of the data storage medium and marking a track in the data storage medium as a function of the sensed position. Sensing the position of the data storage medium may include, for example, sensing an edge of the data storage medium. Marking a track in the data storage medium may include, for example, ablating a track in the data storage medium with a laser.

In a further embodiment, the system presents a method, which comprises receiving a position signal indicative of the position of a data storage medium and generating a control signal as a function of the position signal. A marking device marks a track in the data storage medium as a function of the control signal. This method may also employ feedback and/or feed-forward techniques to direct the marking, which may be performed by ablating with a laser beam.

The details of one or more embodiments of the present invention are set forth in the accompanying drawings and the description below. Other features, objects, and advantages of the present invention will be apparent from the description and drawings, and from the claims.

DETAILED DESCRIPTION

Figure 1:
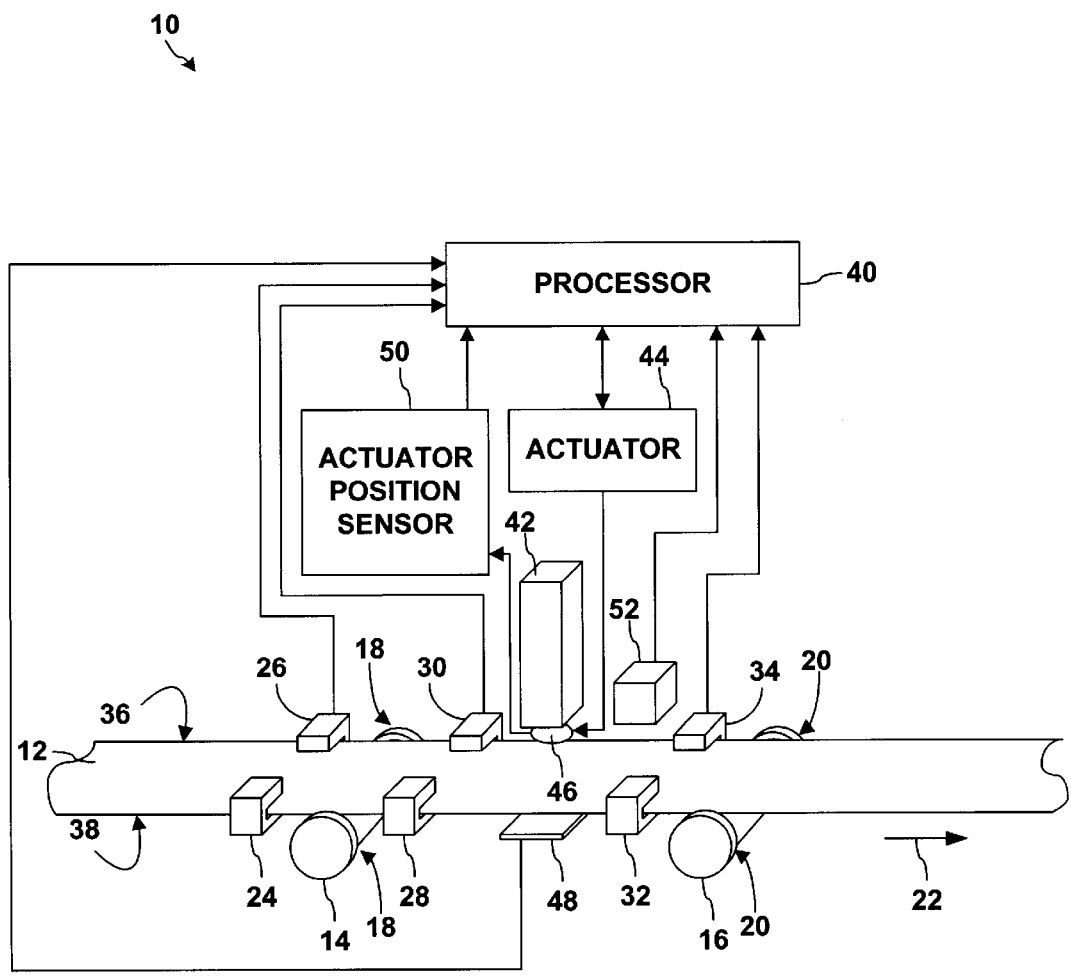
FIG. 1 is a diagram of an ablative laser servo writer.

FIG. 1 is a diagram of an ablative laser servo writer 10 for creating physical marks on a data storage medium such as magnetic medium 12. The embodiment shown in FIG. 1 is for exemplary purposes, and the invention is not limited to the creation of physical marks with a laser. The techniques of the invention may be adapted to marking of magnetic media with marking devices other than a laser-based device. Although the embodiment shown in FIG. 1 makes physical grooves in magnetic medium 12, the invention is not limited to the making of physical marks such as grooves.

The physical marks may be used as servo tracking. Magnetic medium 12, shown in FIG. 1 as a segment of magnetic tape, moves longitudinally through servo writer 10, guided by guides 14 and 16. Guides 14 and 16 may have flanges 18 and 20, respectively. In addition, guides 14 and 16 may be tapered to urge magnetic medium 12 against a flange.

Reference numeral 22 shows the direction of longitudinal motion of magnetic medium 12. The position of magnetic medium 12 is sensed with detectors 24, 26, 28, 30, 32 and 34. Detectors 26, 30 and 34 sense the position of far edge 36, and detectors 24, 28 and 32 sense the position of near edge 38.

Detectors 24, 26, 28, 30, 32 and 34 send position signals to processor 40. Position signals from detectors 24, 26, 28, 30, 32 and 34 allow processor 40 to compute the location of magnetic medium 12 with respect to servo writer 10. In addition, monitoring changes in the position signals with respect to time may allow processor 40 to compute the velocity and/or acceleration of magnetic medium 12 with respect to servo writer 10. In addition, the velocity and/or acceleration of magnetic medium 12 may be computed in terms of the longitudinal and transverse components of velocity and/or acceleration. Velocity may be determined by taking the derivative of position with respect to time, and acceleration may be determined by taking the derivative of velocity with respect to time.

Alternatively, one or more dedicated velocity sensors (not shown in FIG. 1) may transmit velocity signals to processor 40, providing processor 40 with signals indicative of the longitudinal and transverse velocity of magnetic medium 12. Position and acceleration may be determined as a function of velocity. As used herein, the term "position signals" encompasses all of these quantities, including signals reflecting any of the position, velocity or acceleration of magnetic medium 12.

Processor 40 regulates ablative laser 42 by controlling, for example, the power pulse width, the dwell time and/or the duty cycle of a beam emitted by ablative laser 42. Laser 42 may be any of a number of lasers, such as a double Yd:YAG delivering 400 milliwatts of power at an approximate wavelength of 532 nm. In addition, processor 40 may position ablative laser 42 with respect to magnetic medium 12. Processor 40 also generates a signal that controls actuator 44, which in turn controls optical device 46. Optical device 46 directs the laser beam to a particular site upon the surface of magnetic medium 12 and the laser beam performs the ablation. As will be described below, actuator 44 may generate a signal received by processor 40.

The surface of magnetic medium 12 receiving the ablation may be the recording surface or the non-recording surface. The width, depth and number of servo tracks may depend upon the recording format of magnetic medium 12. In 0.25 inch (6.35 mm) magnetic tape, for example, typical servo tracks may be about two micrometers wide by about forty micrometers long by about one-quarter micrometer deep, and spaced on a longitudinal pitch of about 130 micrometers and a transverse (lateral) pitch of about twenty micrometers, providing a data track pitch of about five micrometers.

Servo writer 10 may include dedicated optical detector 48 that senses, for example, the shape and intensity of the laser beam. Optical detector 48 may be used to calibrate actuator 44 and optical device 46. In addition, servo writer 10 may include actuator position sensor 50, which senses the position of the beam during the marking process. A beam position signal may be provided to processor 40 to correct for errors in the position of the beam. Actuator position sensor 50 may be embodied, for example, in a glass scale or an interferometer. Servo writer 10 may further include a detector 52 that monitors the position and quality of the ablated servo tracks, after the tracks are formed. Detector 52 may provide a quality-position signal to processor 40.

Optical device 46 may comprise a focusing apparatus, such as a focusing lens modulated by a signal from a transducer included in actuator 44, such as a piezoelectric transducer, a microelectromechanical systems (MEMS) transducer or a voice coil. Optical device 46 may also include movable flat or curved mirrors that direct the laser beam.

Using position signals from detectors 24, 26, 28, 30, 32 and 34, processor 40 may bring the laser beam to bear with precision upon almost any site upon the surface of magnetic medium 12. Processor 40 may direct the laser beam by performing coarse positioning of ablative laser 42 and/or by performing fine adjustments with actuator 44 and optical device 46.

Although FIG. 1 shows six detectors 24, 26, 28, 30, 32 and 34, more or fewer detectors may be used. The use of six detectors, however, provides more accuracy than using fewer detectors. Detectors 24, 26, 28 and 30, placed before and after guide 14, monitor the position of magnetic medium 12 as magnetic medium 12 engages guide 14. In addition, detectors 24 and 26 may detect anomalies on edges 36 and 38 before those anomalies come in contact with guide 14, providing data to processor 40 that allows processor 40 to anticipate transverse motion as well. Detectors 28, 30, 32 and 34, placed before and after the ablation operation, are useful in bi-directional ablation, in which magnetic medium 12 moves not only in longitudinal direction 22 but in the opposite direction as well.

Detectors 24, 26, 28, 30, 32 and 34 sense the transverse motion and rotation of magnetic medium 12. Position signals from detectors 24, 26, 28, 30, 32 and 34, with beam position signal from actuator position sensor 50, are used by processor 40 and actuator 44 to determine the actual position of magnetic medium 12 relative to the beam. Position signals from detectors 24, 26, 28, 30, 32 and 34, in conjunction with beam position signal from actuator position sensor 50, are further used to correct for errors in the position of the servo marks that may be caused by transverse motion and/or rotation of magnetic medium 12. By placing detectors on both sides of ablative laser 26, the position of magnetic medium 12 may be measured before magnetic medium 12 reaches laser 26, regardless of the direction in which magnetic medium 12 is moving.

Detectors 24, 26, 28, 30, 32 and 34 may detect positions of edges 36 and 38 optically. Optical detectors may include a source of light, such as a light emitting diode or laser, and a detector, such as a photodiode. The photodiodes detect the light and to generate a signal based upon the detected light. Magnetic medium 12 may block a portion of the light causing the signal from the photodiodes to vary according to the amount of blockage. The signal from the detectors may therefore be a function of the position of an edge of magnetic medium 12.

Another form of optical detection may be employed when pilot marks have been placed upon magnetic medium 12. Pilot marks serve as guides for placement of further marks and may, for example, be created by laser ablation. In such a case, detectors 24, 26, 28, 30, 32 and 34 may detect the marks by shining light on magnetic media 12 and detecting light transmitted through the pilot mark or reflected by the pilot mark. Pilot marks may be created by laser ablation, and in the finished product may function as servo tracks. Techniques described herein may be used to create the pilot marks. When creating pilot marks, other techniques for sensing the position of magnetic medium 12, such as optical edge detection, may be employed.

Detectors 24, 26, 28, 30, 32 and 34 may sense the position of magnetic medium 12 in non-optical ways as well. For example, detectors 24, 26, 28, 30, 32 and 34 may be magnetic detectors that sense an edge of magnetic medium 12 or the presence and location of one or more magnetic pilot tracks placed upon magnetic medium 12.

Calculating the position, velocity and/or acceleration of magnetic medium 12 is performed continually as magnetic medium 12 moves with respect to servo writer 10. The path of magnetic medium 12 may be regulated in several ways.

The path of magnetic medium 12 in the form of tape, for example, can be controlled by precise positioning of reels that dispense or take up the tape, or by steering magnetic medium 12 with flanges 18 and 20 on guides 14 and 16.

Although the path of magnetic medium 12 may be regulated, in practice disturbance of magnetic medium 12 is likely to occur in spite of these measures. The disturbance may displace magnetic medium 12 from its ideal intended path. Typically, the displacement is transverse, i.e., perpendicular to direction of longitudinal motion 22.

Disturbances may be caused by countless factors, such as debris on magnetic medium 12, debris on guide 14 or 16, slippage of magnetic medium 12 on guide 14 or 16, or defects in a reel that dispenses or takes up magnetic medium 12. A defect in an edge of magnetic medium 12, for example, may cause a transverse disturbance when the defect engages flanges 18.

A disturbance may disrupt accurate and precise placement of the ablative marks. For ablative marks that function as servo tracks, the disruption of accurate and precise placement is highly undesirable. In many cases, servo tracks are simply assumed to be straight marks at known locations, allowing data tracks to be located by reference to the servo tracks. If a disturbance has caused a deviation in the straightness of a servo track, the usefulness of the servo track may be compromised. During usage of the magnetic media 12, deviations in a servo track may cause mistracking errors to occur.

The invention presents techniques for dynamically compensating for disturbances. Processor 40 receives media position signals from detectors 24, 26, 28, 30, 32 and 34. Processor 40 also receives a beam position signal actuator position sensor 50. With the media and beam position signals, processor 40 compensates for disturbances by regulating optical device 46. By regulating optical device 46, processor 40 redirects the laser beam relative to magnetic medium 12 to compensate for transverse motions of magnetic medium 12.

Generally speaking, a disturbance may be a low-frequency disturbance or a high-frequency disturbance. A low-frequency disturbance is one that causes a slower and more gradual change, and a high-frequency disturbance is one that causes a more rapid change. By selecting optical device 46 for rapid adjustability, servo writer 10 can respond quickly to detected transverse motions and can dynamically compensate for both low- and high-frequency disturbances.

Processor 40 may also dynamically compensate for disturbances by, for example, adjusting the position of ablative laser 42 with respect to magnetic medium 12. Because of the size and mass of laser 42, the technique of dynamic compensation of optical device 46 may be a more practical technique for responding to high-frequency disturbances. Optical device 46 tends to be less massive and easier to move than laser 42.

Similarly, processor 40 may also dynamically compensate for disturbances by adjusting the position of magnetic media 12 by, for example, adjusting the position of guides 14 and 16. Dynamically compensating for disturbance with optical device 46, however, may be more practical, especially for responding to high-frequency disturbances.

Dynamic compensation with optical device 46 may also be employed when ablative laser 42 is used to form multiple tracks on magnetic medium 12 simultaneously. One or more beam splitters (not shown in FIG. 1) may be used to generate a plurality of laser beams. Each laser beam may be individually directed by a dedicated actuator and/or optical device, allowing for several marks in magnetic medium 12 to be created simultaneously.

Figure 2:
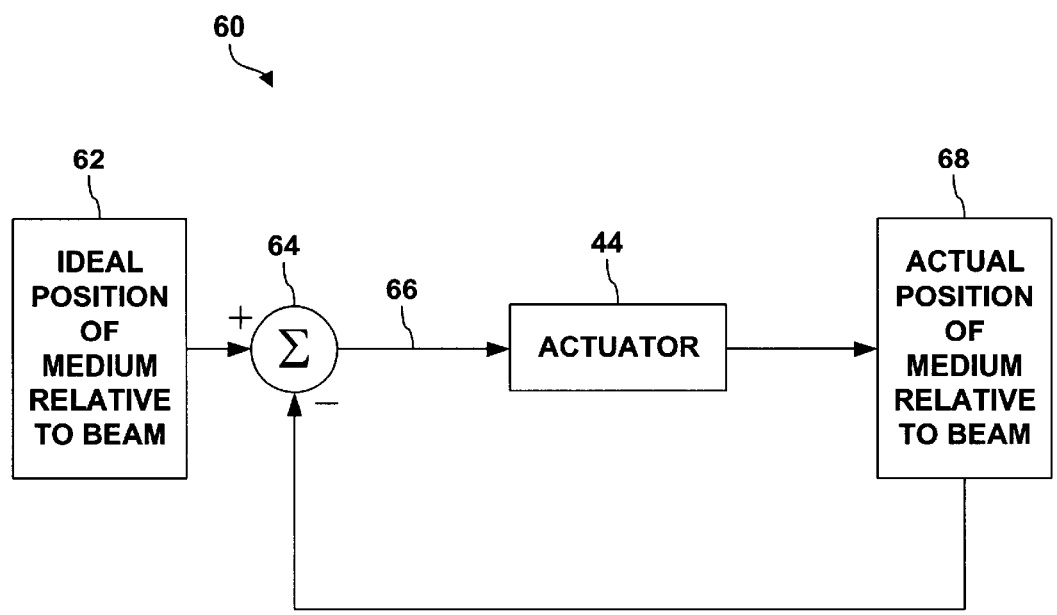
FIG. 2 is a diagram of a feedback system that may be employed by the servo writer.

FIG. 2 shows a block diagram illustrating compensation performed by servo writer 10 using a negative feedback system 60. Processor 40 may be programmed to create a mark at a specific site on magnetic medium 12. In other words, the ideal position of magnetic medium 12 with respect to the beam (62) may be a programmed parameter, embodied as an ideal position signal. The specific site for a mark may be specified, for example, with respect to an edge of magnetic medium 12.

The actual position of magnetic medium 12 with respect to the beam (68) is sensed by detectors 24, 26, 28, 30, 32, 34, 48 and 50. Processor 40 determines the actual position of magnetic medium 12 with respect to the beam (68) from the medium position signals and the beam position signal. Processor 40 may take the difference (64) between the ideal position of magnetic medium 12 with respect to the beam (62) and actual position of magnetic medium 12 with respect to the beam (68), as determined from medium and beam position sensing.

Taking the difference results in the generation of a correction signal (66). Correction signal (66) drives actuator 44, which in turn controls optical device 46 (not shown in FIG. 2). Actuator 44 adjusts optical device 46 to bring the actual position (68) in line with the ideal position of the beam (62), thereby driving correction signal (64) to zero.

Figure 3:
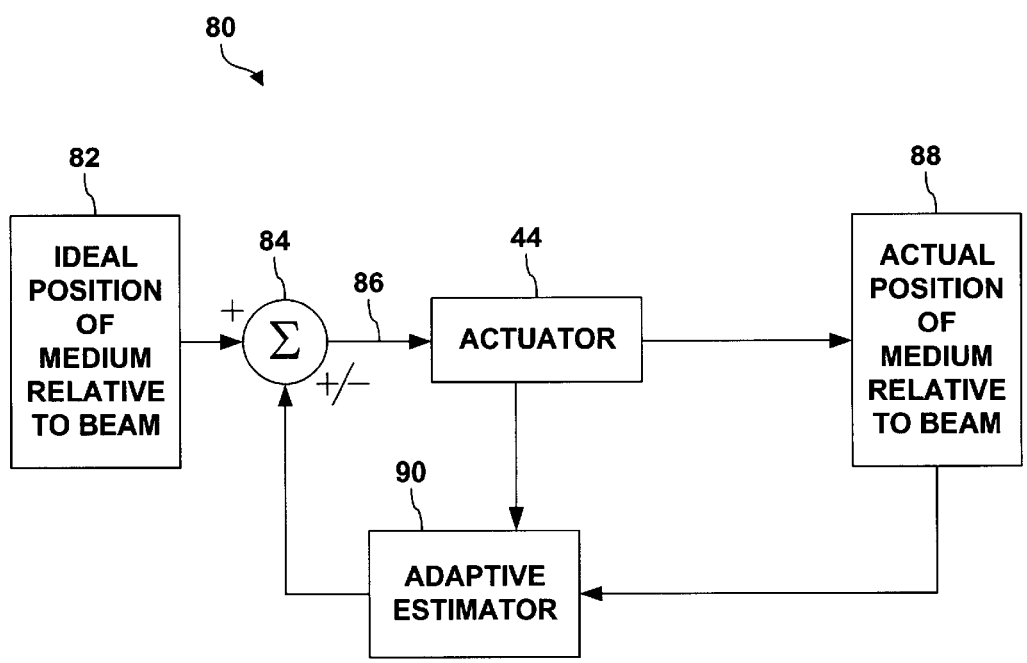
FIG. 3 is a diagram of a feedback/feed-forward system that may be employed by the servo writer.

Response to some high-frequency disturbances may be improved by use of a feedback/feed-forward system 80 shown in FIG. 3. Feedback/feed-forward system 80 uses many of the same components as feedback system 60, but the systems are shown in separate figures for clarity. As in feedback system 60, the ideal position of magnetic medium 12 with respect to the beam (82) is a programmed parameter. The actual position of magnetic medium 12 with respect to the beam (88) is sensed by detectors 24, 26, 28, 30, 32, 34, 48 and 50.

Unlike feedback system 60, feedback/feed-forward system 80 includes adaptive estimator 90, which may be a component of processor 40. Adaptive estimator 90 receives media position signals and beam position signals. Adaptive estimator 90 may also receive signals from actuator 44, indicating, for example, the current operation of actuator 44, such as the state of actuator 44. The signal from actuator 44 may be used by adaptive estimator 90 to estimate, for example, the expected response time of actuator 44.

When a disturbance occurs, adaptive estimator 90 estimates impending motion of magnetic media 12, and what actuator 44 may do to compensate for the disturbance. Adaptive estimator 90 generates a signal that is added or subtracted (84) from the ideal position (82) by processor 40 to generate a correction signal (86) that drives actuator 44.

Adaptive estimator 90 may, for example, introduce a delay, thereby preventing actuator 44 from responding to a disturbance before the disturbance reaches the point where ablation is taking place. The amount of delay may depend, for example, upon the distance from the detecting sensor to laser 42, the longitudinal speed of magnetic medium 12, and the response time needed by actuator 44 to compensate for errors caused by the disturbance.

In some circumstances, adaptive estimator 90 may generate a signal to counteract a negative feedback signal generated in negative feedback system 60. In other circumstances, adaptive estimator 90 may anticipate that actuator 44 may need to begin compensating for the disturbance before the disturbance arrives at the point where ablation is taking place, and may generate a correction signal accordingly. As a result, the correction signal (86) drives actuator 44 to respond ahead of the disturbance.

A number of embodiments of the invention have been described. Nevertheless, various modifications may be made without departing from the scope of the invention. Although the example provided above demonstrated the applicability of the invention to magnetic media in the form of magnetic tape, the invention is not limited to magnetic tape. In particular, the invention can be adapted to provide a physical servo track on any magnetic medium, such as a disk or a drum.

Moreover, the invention is not strictly limited to techniques involving magnetic storage media. The invention may be used, for example, to generate physical marks on other forms of data storage media, such as laser optical tape. The invention is not strictly limited to techniques for forming physical marks, nor is the invention strictly limited to techniques for forming physical marks with a laser and an optical device. The techniques for responding to disturbances in the medium may be applied to any of a number of media and marking devices, such as a magnetic recording head that makes magnetic marks on a magnetic medium. The actuator need not control an optical device as described above, but may control another device that regulates placement of marks from a marking device, such as a servomechanism that moves a magnetic recording head.

The invention may be used with data storage media that have been cut to final dimensions. The invention may also be used, however, to create marks on stock media, i.e., media that has not been cut to final dimensions.

Moreover, although the invention is useful for making servo tracks, the marks made by the invention may serve other purposes as well. One such purpose is that of pilot marks, as discussed above, and another potential application is the creation of a set of marks or rulings having the property of a diffraction grating.

Furthermore, actuator position sensor 50 is depicted in FIG. 1 as an element separate from actuator 44 and processor 40. The invention includes embodiments in which actuator position sensor 50 is included in actuator 44 or processor 40. These and other embodiments are within the scope of the following claims.

What is claimed is:

1. A system comprising:
   a sensor that detects the position of a data storage medium relative to the system;
   a marking device that marks a track on the data storage medium; and
   an actuator that causes the marking device to mark the track as a function of the position detected by the sensor.

2. The system of claim 1, wherein the data storage medium is a magnetic storage medium.

3. The system of claim 2, wherein the magnetic storage medium is magnetic tape.

4. The system of claim 1, wherein the data storage medium is an optical storage medium.

5. The system of claim 1, wherein the marking device comprises a laser that emits a beam to ablate the track in the data storage medium.

6. The system of claim 5, wherein the marking device further comprises an optical device that directs the beam from the laser to an ablation site on the data storage medium.

7. The system of claim 6, wherein the optical device includes a lens.

8. The system of claim 6, wherein the optical device includes a mirror.

9. The system of claim 1, wherein the marking device comprises a magnetic recording head.

10. The system of claim 1, further comprising an actuator position sensor that detects the position of the mark relative to the system.

11. The system of claim 1, wherein the sensor is one of an optical sensor and magnetic sensor.

12. The system of claim 1, wherein the sensor detects the position of the data storage medium by detecting an edge of the data storage medium.

13. The system of claim 1, wherein the actuator includes one of a piezoelectric transducer, a microelectromechanical system, and a voice coil.

14. The system of claim 1, wherein the sensor generates a position signal as a function of the position of the data storage medium relative to the system, and wherein the actuator drives the marking device as a function of the position signal.

15. The system of claim 14, further comprising a processor configured to receive the position signal and to generate a control signal that controls the actuator.

16. The system of claim 15, wherein the processor comprises an adaptive estimator that receives the position signal and generates an adaptive signal, and the control signal is a function of the adaptive signal.

17. A method comprising:
    moving a data storage medium past a marking device;
    sensing the position of the data storage medium; and
    marking a track in the data storage medium as a function of the sensed position, wherein the track is one of a servo track, a pilot mark, and a diffraction ruling.

18. The method of claim 17, wherein sensing the position of the data storage medium comprises sensing an edge of the data storage medium.

19. The method of claim 17, wherein marking a track in the data storage medium comprises ablating a track in the data storage medium with a laser.

20. The method of claim 17, further comprising:
    generating a position signal as a function of the position of the data storage medium; and
    marking the track in the data storage medium as a function of the position signal.

21. The method of claim 20, further comprising:
    generating a correction signal as a function of the position signal and an ideal position signal; and
    marking the track in the data storage medium as a function of the correction signal.

22. The method of claim 17, further comprising cutting the data storage media to final dimensions following marking.

23. A method comprising:
    receiving a position signal indicative of the position of a data storage medium; and
    generating, as a function of the position signal, a control signal for control of a marking device that marks a track in the data storage medium.

24. The method of claim 23, further comprising differentiating the position signal to generate a velocity signal.

25. The method of claim 24, further comprising generating the control signal as a function of the velocity signal.

26. The method of claim 23, further comprising:
    receiving an ideal position signal, the ideal position signal indicative of the ideal position of the data storage medium;
    receiving an actuator signal, the actuator signal indicative of the operation of an actuator that directs the marking device; and
    generating a driving signal as a function of the ideal position signal and the actuator signal.

* * * * *